Aug. 1, 1967 J. E. SOOS 3,334,189
DELAY STORAGE TIME SLOT SELECTOR
Filed Aug. 17, 1965

INVENTOR,
JAMES E. SOOS.
BY Harry M. Saragovitz
Edward J. Kelly, Herbert Berl
& Julian C. Keppler
ATTORNEYS United States Patent Office 3,334,189
Patented Aug. 1, 1967

3,334,189

DELAY STORAGE TIME SLOT SELECTOR

James E. Soos, Eatontown, N.J., assignor to the United States of America as represented by the Secretary of the Army Filed Aug. 17, 1965, Ser. No. 480,532
2 Claims. (Cl. 179—15)

The invention described herein may be manufactured and used by or for the Government for governmental purposes, without the payment of any royalty thereon.

This invention relates to time division multiplex techniques and particularly time slot storage means as used in telephone central offices for supervision and switching of multiple lines with a minimum of central office equipment. A typical such system is shown in Brightman Patent No. 3,134,859, involving considerable detail of collateral equipment and features, but only the basic operation need be considered, and even this can be extensively modified. The present invention is particularly suited for use with such modifications. Although the patent is very long, a brief summary will provide the necessary background for the present invention, with considerable detail readily available in the complete patent if needed. The following summary notes a few of the most significant alternatives and refers to only a few of the components (with the figure numbers generally identified by the hundreds and thousands digits of the component reference numbers):

A. Subscriber lines identified by dial numbers are assumed to be directly connected to the central office equipment, although multiplex line connections could also be used. Within the central office, supervisory connections for calling (CLG) and terminating or called (CLD) lines are time division multiplexed onto a common channel by assignment to available repetitive regularly spaced time slots; this would be concerned primarily with DC or low frequency currents in subscriber lines, requiring only infrequent sampling on each line in view of the low frequency, but involving all lines to see if previously idle lines have become OFF-hook in need of service. The voice switching connections between CLG and CLD lines are also shown multiplexed onto a common voice channel in the same time slots; this would be concerned primarily with audio frequency currents, requiring frequent sampling for reasonable speech quality, but only for lines actually in use. The voice circuits could be continuously conected by a suitable switching network even though it is controlled by a multiplexed supervisory system, or there might be different multiplex rates for voice switching and supervision. In each case any slots commonly are repeated at regular equal intervals and a single complete set of such slots over such a standard interval is considered as a frame.

D. The supervisory system involves a time slot store (to which the present invention particularly relates) including a delay 1350, having a standard one frame period with suitable gates at input and output. This is used for allotting time slots for test of lines requiring new service and for actually providing such service. Its input therefore is supplied with only idle time slots. An input gate 1346 permits entry of only a single idle time slot, then closes at least for one frame. This new input slot also steps a counter 310 to 319 to scan the lines in succession the same as though dialled almost once in each frame (but far faster than actual dialling), and comparator 320 to 359 identifies any Busy line by matching the counter number setting to the Busy line numbers stored in each of the slots of a complete frame, either as CLG number in store 421 or CLD number in store 714. Determination of a line as Busy is based on assignment to a time slot, also made Busy thereby, but usually represents an OFF-hook condition, except the CLD while ringing or both momentarily at end of call. Similarly, determination as Idle usually represents an ON-hook condition, except the CLG party briefly while awaiting a time slot. The CLG and CLD stores are shown as plural time multiplexed delay units, of identical frame time, storing combinational codes in each time slot. Matrices 560 and 950 responsive to these codes are used to switch the lines onto the multiplex supervisory channels during the corresponding slot times; as shown the lines are similarly switched onto the voice channels. The Busy line test is completed in a single frame, but also requires the entire frame for completion, and therefore is not multiplexed. If the line is identified as Busy anytime during the test frame the two-state 1358 is actuated to re-circulate the same slot for use in the next frame, and to advance the counter to test another line. However, if the line is Idle the slot is reserved for more extensive test and possible use by the line on a multiplex basis, with the line number now retained in the CLG store under the corresponding time slot. Meantime a new slot is entered in the delay unit to continue checking other lines.

C. This Idle line is then checked during its time slot to determine whether ON or OFF-hook, extending over several frames to avoid noise errors. If found to be actually ON-hook its line number in CLG store is cancelled leaving both line and time slot Idle. If found OFF-hook dial tone is supplied into voice channel, multiplex counters involving delay lines 1252 are ready to register dialing pulses, and newly dialled number eventually will be retained in CLD store under the same time slot. Preliminary length counters 1142 and 1213 are used to distinguish intervals between individual dial pulses from intervals between pulse groups or decimal number digits, and such pulses from a true ON-hook at end of calls. Rapid sampling needed for voice quality is superfluous for dial pulse low frequency components and would require length counters to have a large capacity. This is avoided by sampling only one frame in every 50 under control of delay 1308 and its auxiliary circuits, for operating such counters. This is one example showing that the same multiplex rate for voice and supervision, although convenient, may be inefficient. When the new CLD number is complete it is stored in 717 for an entire frame and comparators 801 and 804 determine whether it is already Busy, providing a Busy tone to CLG line, or Idle, providing a ringing tone to CLD line. When the CLD line becomes OFF-hook the ringing is stopped and multiplex voice channel is available until the counter 1213 responds to a sustained ON-hook by the CLG party to cancel all the stored data for the call. It will be recognized that this actual dialling time requires a great many frames to identify a particular line on an individual basis by each of many CLG parties but can be operated in multiplex during the many slots of each frame, whereas: (1) the counter operation noted above, merely to provide a sequential scanning of all lines on a wholesale basis by a single central office "robot operator," and (2) the CLD line busy test after completion of dialling by various CLG parties, require comparison through entire but only single frames, and therefore cannot be multiplexed within the slots of each frame, although successive frames are used for new comparisons.

D. The more sophisticated details of overall operation of a complete system are not considered of essential significance to the present invention but may be found in the patent if desired.

Such systems involve large numbers of very simple gates and many rather simple two-state circuits as shown to portray the operation, and various rather simple amplifiers and inverters not always shown but required to maintain signal amplitudes. Certain crude forms of delay unit not requiring linear phase-frequency characteristic also may be fairly simple. However, the usual substantially linear delay unit with its auxiliaries is the most sophisticated and expensive element normally required in such systems. The delay units normally are assumed to include means for re-clocking to avoid gradual drift in breadth and time of pulses. These are frequently magnetostrictive devices, involving acoustic wave propagation because of the substantial delay time required, but inherently adapted to electrical input and output, with any necessary amplifiers. Various more conventional acoustic means may be substituted also requiring electrical to acoustic transducers, using quartz, glass, or other solids for fixed delay or mercury or other liquids for variable delay. In some cases these involve highly directional waves reflected many times through the same medium in different directions to get the maximum delay from a given bulk of the delay medium. Electromagnetic delay lines might be used in certain applications, when the desired frame interval is very short, corresponding to electromagnetic propagation time. Since the term "lines" is herein applied to the subscriber connections it is not being generally used regarding the delay units. These must be accurately made or adjusted to the same standard interval to assure proper synchronization.

A certain amount of overlapping of the signals in various time slots is likely to occur in the delay units themselves or in associated circuits. In the case of analog signals such as those in the voice channels of the Brightman patent the cross-talk between channels may become very annoying, or possibly obscure the intended message. In the case of binary or control signals minor overlapping effects may be excluded until of sufficient amplitude to cause actual failure of operation, perhaps more serious to the entire system than the mere cross-talk. When the system loading is light the difficulties may be minimized by skipping some time slots or even alternate time slots. Thus better service is available under light loads, tending to encourage more use, and spreading the load. Under heavy loads the maximum capability of the system can be used, although the increased quality in service is not available.

It is therefore the principal object of the present invention to provide more efficient use of the delay units, and circuits associated with or controlled by them. Other incidental objects will also become apparent from the following description and claims, as illustrated by the accompanying drawings, in which:

FIGS. 1 and 2 involve only minor variations from the art such as Brightman, convenient to show in an elementary manner one setting in which the invention might be used;

Figure 1:
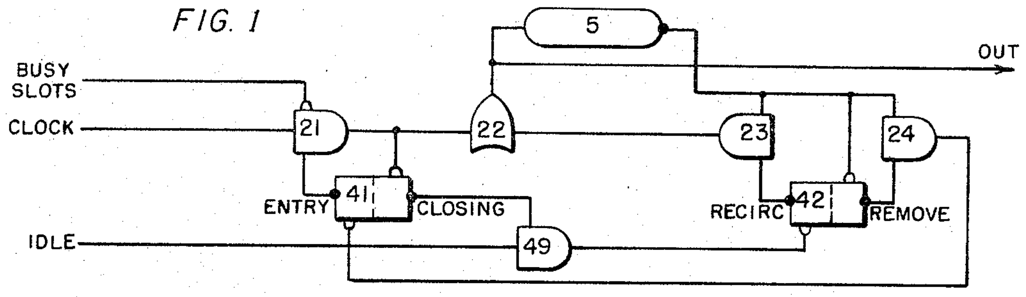

To avoid ambiguities and even inconsistencies in the use of logic symbols, and exclude any implication of preferring a particular polarity or schematic circuit, the drawings have been based generally on the MIL–STD 806B Symbols, considering binary input and output conditions merely as "active" or "inactive," summarized briefly as follows (in many cases with certain exceptions, extensions, or explanations noted in parentheses):

(a) A small circle (or preferably partial circle to avoid confusion with other uses for a circle) for a NOT, INHibit, inversion, or complementing circuit, usually at input or output of another symbol—analyzed as a polarity reversal transformer, an additional active (not merely passive) transistor or tube inverter circuit, a connection to an oppositely activated input or output, or part of a modified logic element designed for oppositely activated input or output, all of like effect and merely selected according to economy of components in the particular situation;

(b) A rounded and narrow rectangle for delay, with transverse line near input lead (or more simply a berry on output lead or leads, also suitable for use with other symbols, particularly two-state circuits noted below, whose shape does not distinguish input and output leads);

(c) A common D shaped shield with input leads on (or near) flat side for AND gate, having output from curved side active only if all inputs are active;

(d) Such AND gate shield with one NOT or INHibit input, commonly designated as INHibit gate;

(e) A shield with one concave (input) and two convex sides for OR gate, having output from point between convex sides active if any input is active, or conversely from the AND viewpoint having output inactive only if all inputs are inactive;

(f) A mere wide rectangle suggesting the two amplifying "sides" of the various binary or two-state circuits (the rectangle including a dashed divider line to emphasize the two sides and berries on output leads as in delay symbols) always assuming at least one "input" to each side, the present application involving usual bistable operation, mainly with separate directive inputs to each side, or with a single non-directive Mod–2 counter or complement input to both sides, commonly shown at the divider line.

Certain further expressed viewpoints as to two-state operation will be helpful to avoid ambiguity. In the past, in many cases the same symbols have been used for inconsistent modes of operation even in different portions of a single diagram, and in most cases the mode is not expressly stated but must be determined by analysis of the operation or results desired. A two-state involves some inversion in the cross-coupling between the two sides and often in the amplification, but the basic symbol should assume no inversion between input and output of a side unless an appropriate NOT symbol is actually shown. It usually requires only a brief pulse input signal to start its active output, which is then sustained, and even if signal is also sustained its input circuit provides the effect of such a pulse only at transition. Therefore, the transition to beginning of active input into one side is assumed to start active output from the same side, and merely by including a NOT symbol at input it is convenient to portray the converse operation, in which the transition to ending of active (beginning of inactive) signal on the connected lead becomes effective to start the output. This provides an easily remembered convention to indicate:

(a) On which side output starts, and (b) Whether such output starts at the beginning or ending of active signal on the input lead. Internally supplied delayed inputs often provided by an elementary R-C circuit may conveniently be indicated by X in place of one input lead for monostable, or both for astable or true "multivibrator" operation. Certain hybrid combinations of these are also fairly common. The closely related threshold circuit involves a continuous analog input, not the pulse effect used with binary input, to change active output from one side to the other at some predetermined level on the input, merely shown direct to one side and through a NOT to the other side.

FIG. 1 involves a delay unit 5 and various gates generally equivalent to the delay unit 1350 and its gates in Brightman. OR gate 22 admits new slots from gate 21 or recirculated slots from gate 23 to the delay. Gate 21 includes a clock input and busy slot INHibit input to admit only Idle slots when permitted by bistable 41. In the patent, half adder 1344 (inherently including EXCLusive-OR gate sub-functions) merely passes time slots from clock input in the absence of Busy slots from 1332 and 1326. This same purpose may be accomplished merely by the INHibit gate portion of the more complex circuit, for which no separate symbol was recognized in the patent. The present diagram avoids the more complex form of circuit by including only the essential sub-function in gate 21. When the gate admits one slot the ending of such slot changes bistable 41 to close the gate. The output of the delay unit may recirculate back to its input through AND gate 23 or may be removed through AND gate 24 depending on the setting of bistable two-state 42. When the slot is removed its ending changes bistable 41 to reopen gate 21 for a new slot. Since recirculation may be desired only in case of a determination that tested line is already Busy, two-state 42 is changed by the delay output at the end of any slots recirculated to open gate 24 for removal of such slots after recirculation. If the last slot had been removed the two-state would be already changed and output of delay would have no effect on it, but would merely be harmless. The AND gate 49 has active input from bistable 41 after a new slot is entered (and in the system of Brightman the counter has been advanced to check a new line number) and a continuous active input from the comparator if lines are Idle. When a line is found to be busy the now inactive input changes bistable 42 to recirculate the next slot from the delay unit, and then immediately change it again to remove the slot next time. In the patent all slot inputs to the delay are applied to bistable 41, and only recirculated slots are applied to bistable 42, but the actual operation is the same in either case.

Figure 2:
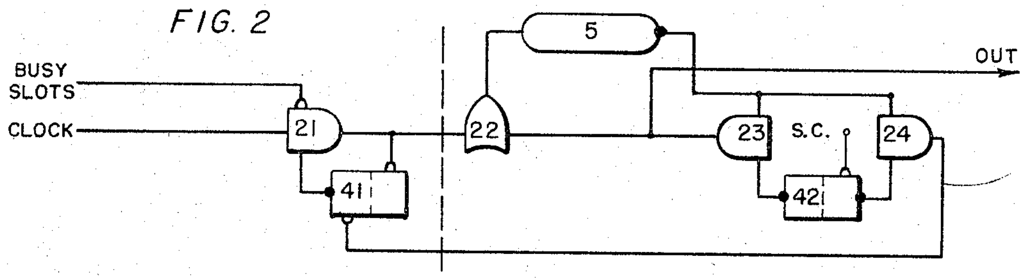

In FIG. 2, the gate 49 is omitted and operation of bistable 42 is modified. In this case the ending of a removed slot changes bistable 42 (as well as 41) to allow recirculation until a scan control signal is applied to bistable 42 to cause removal of the slot from the delay. This mode of control is often more convenient than that used in the patent.

Figure 3:
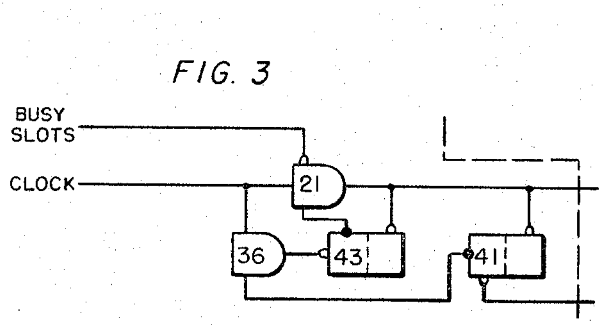
FIG. 3 shows one species of the invention in which the simple input circuit of FIG. 2 is so modified that when a new slot is to be entered the first slot is skipped.

In FIG. 3, the two-state 41 does not directly control AND gate 21. Instead, an intermediate two-state 43 is first operated through AND gate 36 at the end of the first clock pulse after operation of two-state 41. Two-state 43 then opens AND gate 21 for the next Idle slot. When an Idle slot is entered both two-states 41 and 42 are operated at the end of such slot to prevent entering another slot, as in FIG. 2, and to provide for similar operation the next time the scan control is actuated to remove the stored time slot and enter another. By this extremely simple expedient the probability of cross-talk in such systems has been substantially decreased.

Figure 4:
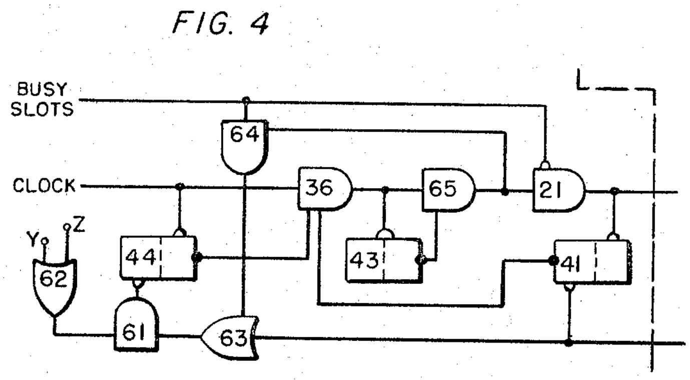
FIG. 4 shows another species in which alternate slots are skipped and in case of an even total number of slots the alternate operation is modified to permit entry of odd slots, then even slots, on successive operations.

In FIG. 4 also the two-state 41 first controls operation of two-state 43 through AND gate 36; in this case two-state 43 is operated in the bistable counter mode at the end of each slot. Two-state 43 then opens AND gate 65 to pass only alternate clock slots to AND gate 21 in which the Busy inhibit input provides for entry of only Idle pulses into the delay unit 5 (FIG. 2) and operation of two-state 41 to close AND gate 36. The timing sequence is such that two-state 43 would close gate 65 at the same time two-state 41 closes gate 36. Therefore, when two-state 41 again opens gate 36 another time slot is needed before two-state 43 can open AND gate 65, thus maintaining the alternate operation.

If the number of time slots in a complete frame were even, only odd or only even slots could ever be entered. To avoid this another two-state 44 provides a further control over AND gate 36. To close gate 36 this two-state is operated at the end of certain time slots indicated as Y or Z applied through OR gate 62 then AND gate 61. The other input to AND gate 61 is supplied through OR gate 63 from two sources; if slot Y (or Z) is removed from the delay unit and operates two-state 41 it also operates two-state 44 to close AND gate 36. After one more slot Z (or A) the clock input to two-state 44 can restore it to open gate 36 for A (or B). This permits two-state 43 to open gate 65 for slot B (or C) if Idle. Thus in either case the A slot is not utilized. Although illustrated by alphabetical designations for convenience ordinarily the number of slots would be even larger than 26 and the lost slot of no significance even if not usable for some other purpose. This mode of operation to shift back and forth from Odd to Even would fail if slot Y or Z were not entered in the delay unit because busy. In such case the slot would immediately be supplied to OR gate 63 through AND gate 64 without waiting for storage in and removal from the delay unit. From another viewpoint, once slot Y or Z passed gate 65 it would reach OR gate 63 immediately or eventually. Merely applying the output of AND gate 65 to AND gate 61 without the two alternative paths would permit two-state 44 to restore operation of AND gate 36 promptly after removal of slot Y or Z from the delay unit, thus not properly skipping a slot to shift back and forth from Odd to Even. Another simple way to avoid this difficulty is to apply the output of two-state 41 to an AND gate in the clock lead prior to the connection into two-state 44, thus whenever two-state 41 is operated to enter a new slot after Y or Z the two-state 44 will require a one slot delay, whether Y or Z had been Idle or Busy.

Typical applications of the invention have been illustrated and many other variations will be apparent to those skilled in the art.

What is claimed is:

1. A delay time slot storage system including a delay unit having a period corresponding to a plurality of time slots comprising one frame, said slots being available for separate messages involving possible cross-talk between messages using adjacent slots, an input-output circuit connected to said delay unit including:

an input AND gate to allow entry of selected time slots from a source to be stored in said delay unit, a control device for said input gate to allow entry of a new slot and responsive to such new slot to stop further entry of new slots, a second AND gate to allow recirculation of a time slot in said delay unit for a plurality of frames, a third AND gate responsive to a slot removed from said delay unit to operate said control device to allow entry of another slot, a joint control device to allow operation of said second gate except when allowing operation of said third gate, said joint control device being arranged to start operation of said third gate in response to a control signal and to stop operation of said third gate after removal of a slot, said control device for the input gate including means to exclude from the input gate the first slot following that removed through said third gate, whereby said slots entered in said units are better separated to reduce cross-talk when all slots are not in use.

2. A delay time slot storage system including a delay unit having a period corresponding to a plurality of time slots comprising one frame, said slots being available for separate messages involving possible cross-talk between messages using adjacent slots, an input-output circuit connected to said delay unit including:

an input AND gate to allow entry of selected time slots from a source to be stored in said delay unit, a control device for said input gate to allow entry of a new slot and responsive to such new slot to stop further entry of new slots, a second AND gate to allow recirculation of a time slot in said delay unit for a plurality of frames, a third AND gate responsive to a slot removed from said delay unit to operate said control device to allow entry of another slot, a joint control device to allow operation of said second gate except when allowing operation of said third gate, said joint control device being arranged to start operation of said third gate in response to a control signal and to stop operation of said third gate after removal of a slot, said control device for the input gate including means to exclude from the input gate the first slot following that removed through said third gate and then further regularly spaced slots, in which the number of slots in such spacing and the total number of slots both have common factors, such that use of some slots would be lost, and means to exclude an occasional other slot, whereby said slots entered in said units are better separated to reduce cross-talk when all slots are not in use, but all said slots remain available for entry in said units.

References Cited

UNITED STATES PATENTS

| | | | |
|---|---|---|---|
| 3,134,859 | 5/1964 | Brightman ---------- | 179—18.9 |
| 3,150,324 | 9/1964 | Hallden et al. ------- | 328—56 |

JOHN W. CALDWELL, *Acting Primary Examiner.*

ROBERT L. GRIFFIN, *Examiner.*